United States Patent
Shimizu

[11] Patent Number: 5,369,638
[45] Date of Patent: Nov. 29, 1994

[54] LINE INTERFACE FOR HIGH-SPEED TRANSMISSION LINE

[75] Inventor: Toshimitsu Shimizu, Tokyo, Japan
[73] Assignee: NEC Corporation, Tokyo, Japan
[21] Appl. No.: 8,820
[22] Filed: Jan. 25, 1993
[30] Foreign Application Priority Data
Jan. 24, 1992 [JP] Japan .................................. 4-010501
[51] Int. Cl.⁵ .............................................. H04J 3/22
[52] U.S. Cl. .......................................... 370/84; 370/68
[58] Field of Search .................. 370/84, 94.1, 110.1, 370/68, 109, 43, 63

[56] References Cited
U.S. PATENT DOCUMENTS
4,740,959  4/1988  Kosugi et al. .......................... 370/68
4,817,083  3/1989  Richards ................................ 370/59
5,046,067  9/1991  Kimbrough ............................. 370/68

Primary Examiner—Douglas W. Olms
Assistant Examiner—Shick Hom
Attorney, Agent, or Firm—Foley & Lardner

[57] ABSTRACT

A line interface incorporated in a high-speed transmission line system for transmitting and receiving one time slot of the transmission line. A speed changing circuit replaces a high-speed transmission line with n low-speed internal lines. Hence, data transmitting and receiving circuits in each internal unit operate at low speed, saving power to be consumed by the internal unit. Since the time slots which each internal unit uses are the same on all of the internal lines, a single time slot selecting circuit suffices for each internal unit, promoting efficient circuit configuration.

6 Claims, 11 Drawing Sheets

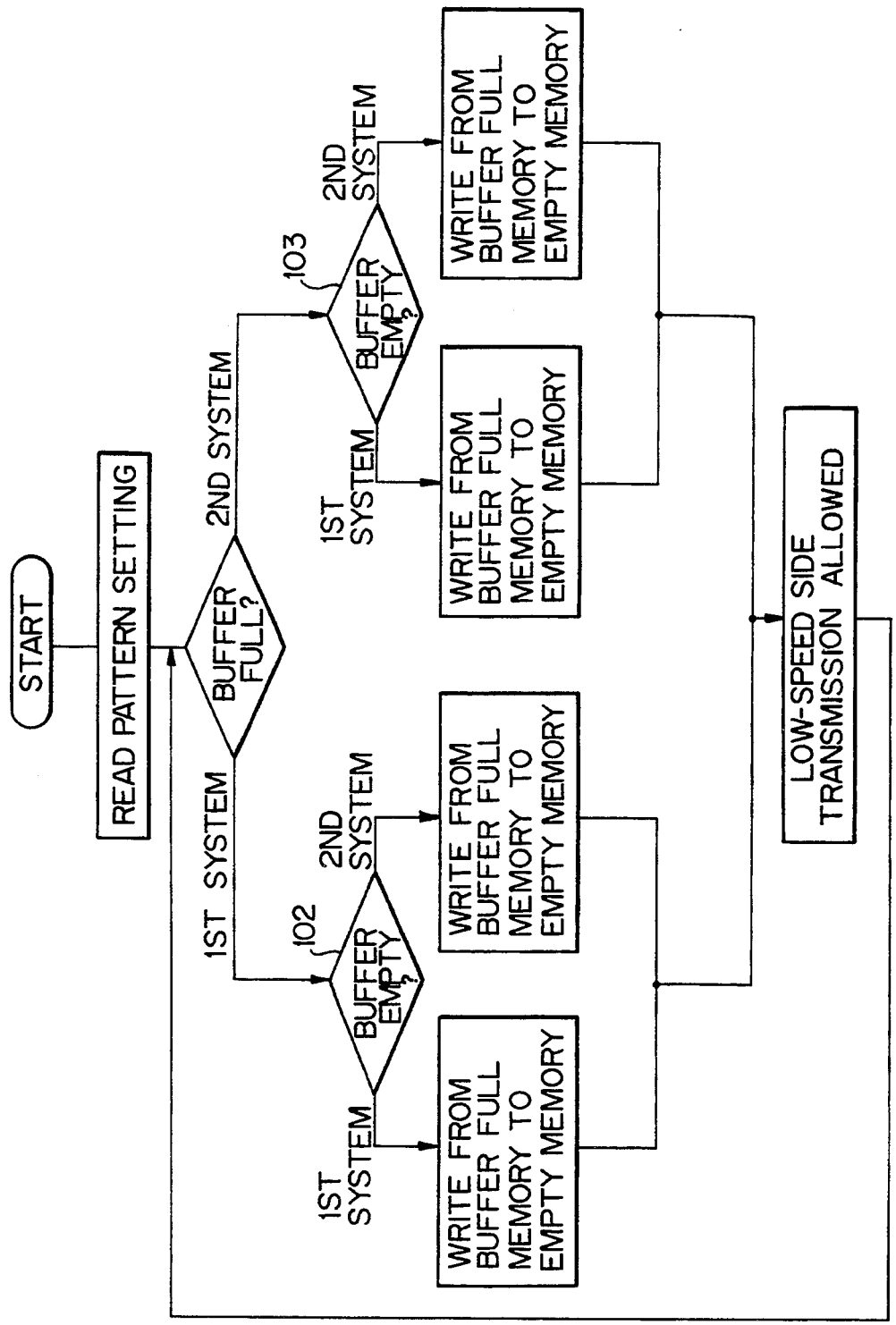

LINE INTERFACE FOR HIGH-SPEED TRANSMISSION LINE

BACKGROUND OF THE INVENTION

The present invention relates to a high-speed transmission line system and, more particularly, to a line interface for a high-speed transmission line system.

It a common practice to provide a high-speed transmission line system with a line interface connected to a high-speed transmission line. The line interface is made up of an interface circuit for effecting an Alternate Mark Inversion/Transistor-Transistor Logic (AMI/TTL) or similar conversion, and a line state sensing circuit. Usually, a signal format on the high-speed transmission line has one period implemented as n time slots TS1-TSn and is maintained even after the high-speed line has been converted to internal lines by the line interface. Internal units incorporated in the transmission line system each transmit and receive data in one of the time slots TS on the internal lines. Hence, the time slot to be received by each of the internal units is determined on the basis of the location, internal arrangement and so forth of the unit. Each internal unit has n blocks for transmitting and receiving data in the time slots on the internal lines. Connected to the internal lines, the blocks each have a time slot selecting circuit for selecting a time slot, a data transmitting and receiving circuit for transmitting and receiving data in the time slot selected, and a logic circuit. Further, each block reports the time slot selected by the time slot selecting circuit to the data transmitting and receiving circuit which in turn reports such data to the logic circuit.

However, the conventional high-speed transmission line system, particularly a system having a plurality of time slot transmitting and receiving blocks in each internal unit, has some problems left unsolved. Namely, n identical time slot selecting circuits are built in each unit, resulting in wasteful circuit arrangement. Since the data transmitting and receiving circuits are connected to the internal lines and built in each internal unit, the individual unit consumes great current to thereby aggravate the current consumption of the entire system.

SUMMARY OF THE INVENTION

It is, therefore, an object of the present invention to provide a line interface for a high-speed transmission line system which simplifies internal units and saves current to be consumed by each individual internal unit.

A high-speed transmission line system connected to a high-speed transmission line for transmitting and receiving one time slot of the high-speed transmission line of the present invention comprises m internal units each being made up of n blocks, n low-speed internal lines connected to the m internal units, and a line interface for converting time slots of a signal received over the high-speed transmission line to the n low-speed internal lines and reconstructing the n low-speed internal lines into a single high-speed line and connecting the single high-speed line to the high-speed transmission line. The n blocks of each of the m internal units select the same time slots of the n low-speed internal lines.

BRIEF DESCRIPTION OF THE DRAWINGS

The above and other objects, features and advantages of the present invention will become more apparent from the following detailed description taken with the accompanying drawings in which:

FIG. 11 is a flowchart representative of the operation of the line interface shown in FIG. 10.

DESCRIPTION OF THE PREFERRED EMBODIMENT

Figure 1:
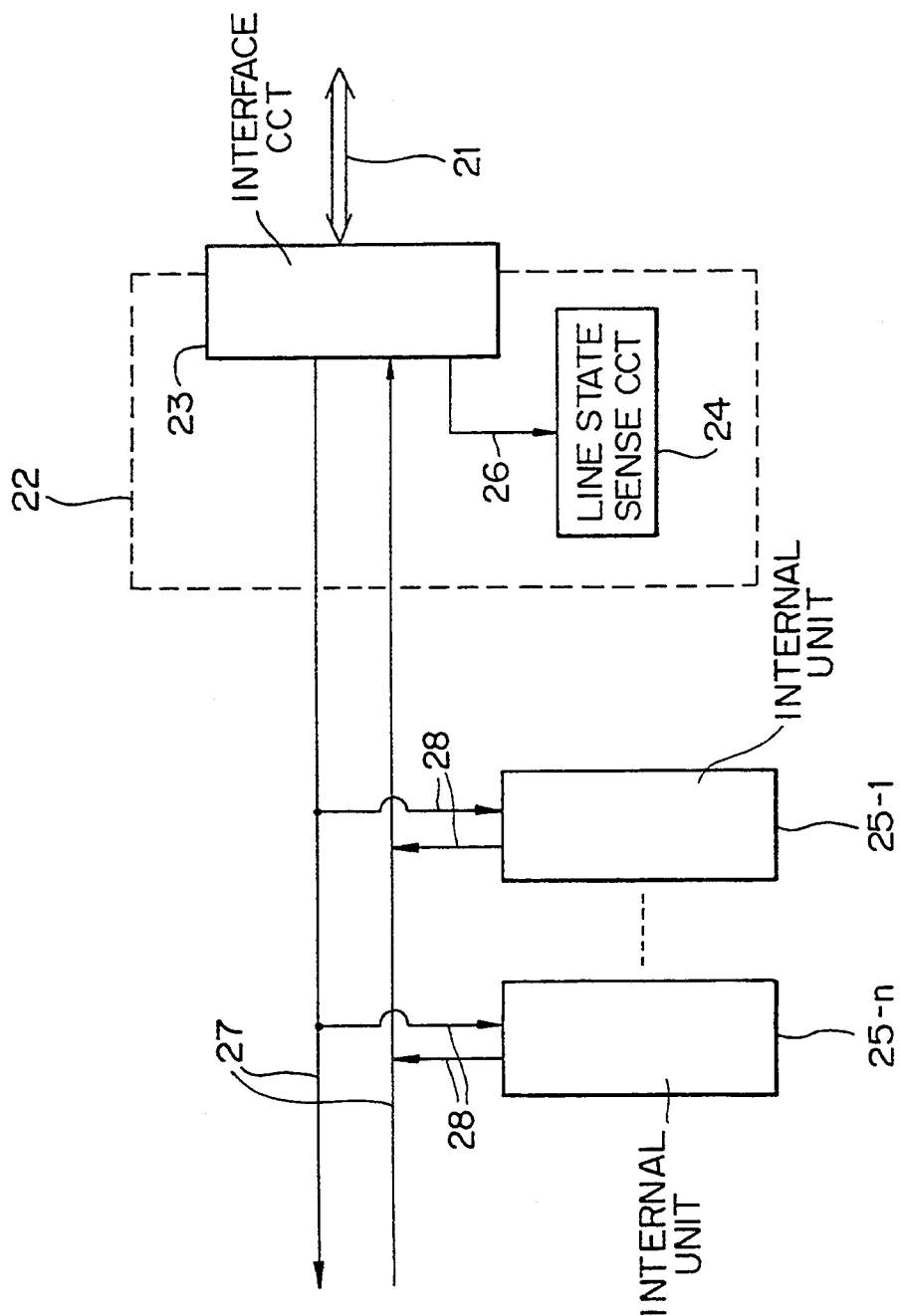
FIG. 1 is a block diagram schematically showing a conventional high-speed transmission line system.
Figure 2:
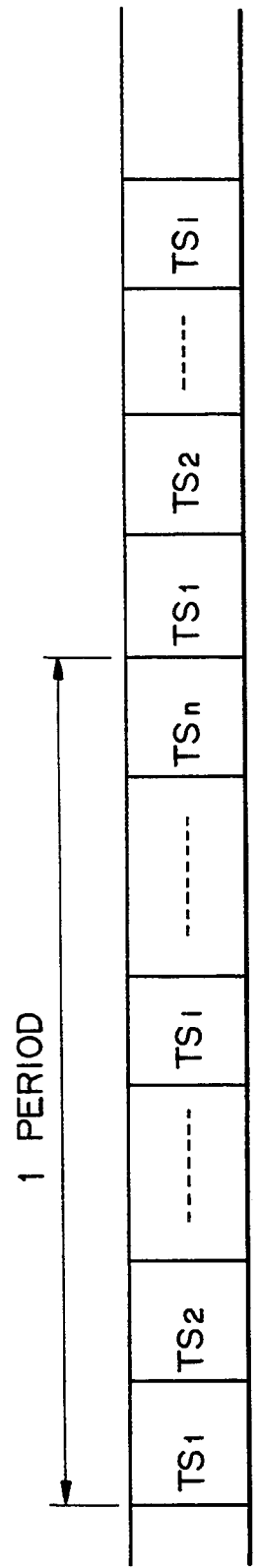
FIG. 2 shows a signal format particular to the conventional high-speed transmission line system.

To better understand the present invention, a brief reference will be made to a conventional line interface for a high-speed transmission line system, shown in FIG. 1. As shown, the system includes a line interface 22 connected to a high-speed transmission line 21. The line interface 22 is made up of an interface circuit 23 connected by line 26 to a line state sensing circuit 24. The interface circuit 23 effects AMI/TTL or similar conventional conversion. FIG. 2 shows a signal format particular to the high-speed transmission line 21 and having n time slots TS1 to TSn in one period thereof. The signal format does not change even after the high-speed line 21 has been converted to an internal line 27 by the line interface 22. Units 25-1 to 25-n are incorporated the system, and each are connected to line 27 via lines 28 to transmit and receive data by using a particular time slot over the internal line. Specifically, a particular time slot is assigned to each of the units 25-1 to 25-n depending on the location, internal arrangement and so forth of the unit.

Figure 3:
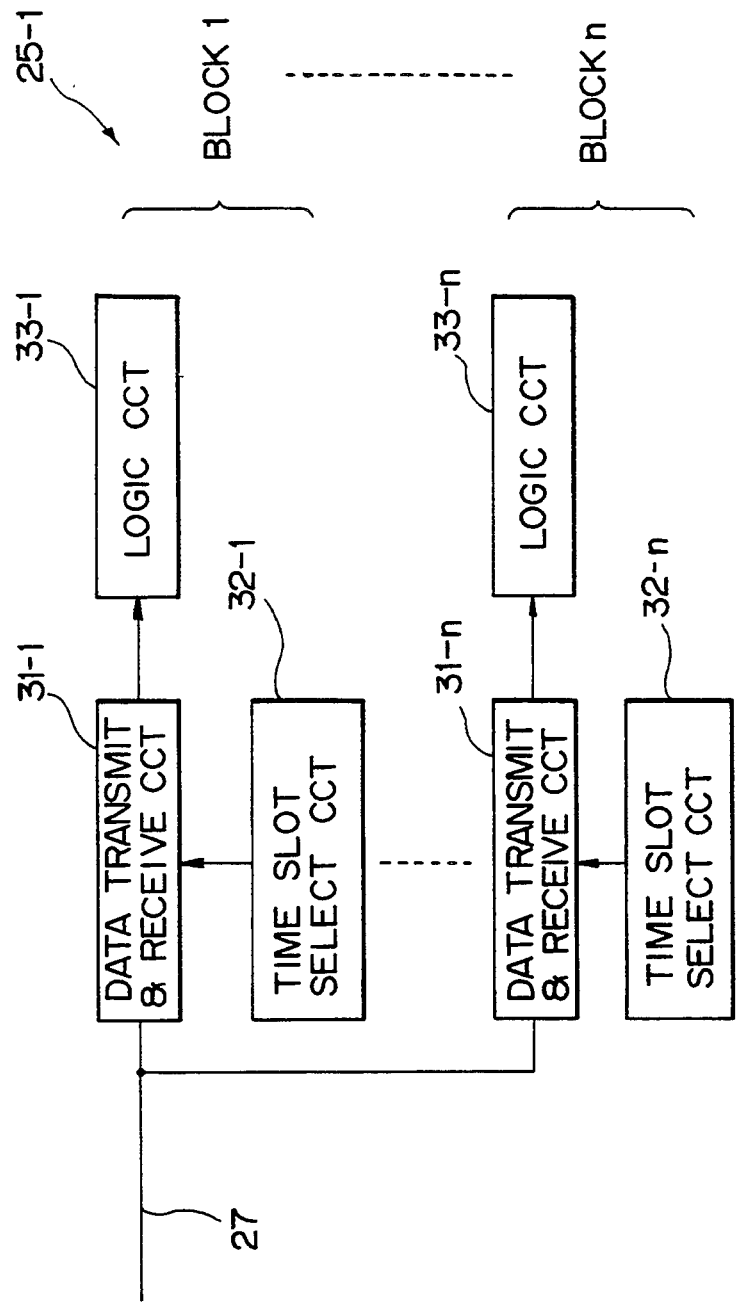
FIG. 3 is a schematic block diagram showing an internal unit included in the conventional system.

As shown in FIG. 3, the units 25-1 to 25-n (represented by the unit 25-1) have n blocks for transmitting and receiving data over the internal line 27. The n blocks have respectively time slot selecting circuits 32-1 to 32-n, data transmitting and receiving circuits 31-1 to 31-n for transmitting and receiving data in the time slot selected, and logic circuits 33-1 to 33-n. These n blocks are commonly connected to the internal line 27. Each Of the blocks 1-n reports the time slot selected by associated One of the time slot selecting circuits 32-1 to 32-n to associated one of the data transmitting and receiving circuits 31-1 to 31-n. Then, the data transmitting and receiving circuit of interest transfers only such data to associated one of the logic circuits 33-1 to 33-n.

As stated above, in the conventional system, n identical time slot selecting circuits 32-1 to 32-n are wastefully built in each of the units 25-1 to 25-n. Moreover, since the data transmitting and receiving circuits connected to the internal line 27 are incorporated in all of the units 25-1 to 25-n, each unit consumes great current. This aggravates the current consumption of the entire system incorporating a great number of such units.

Figure 4:
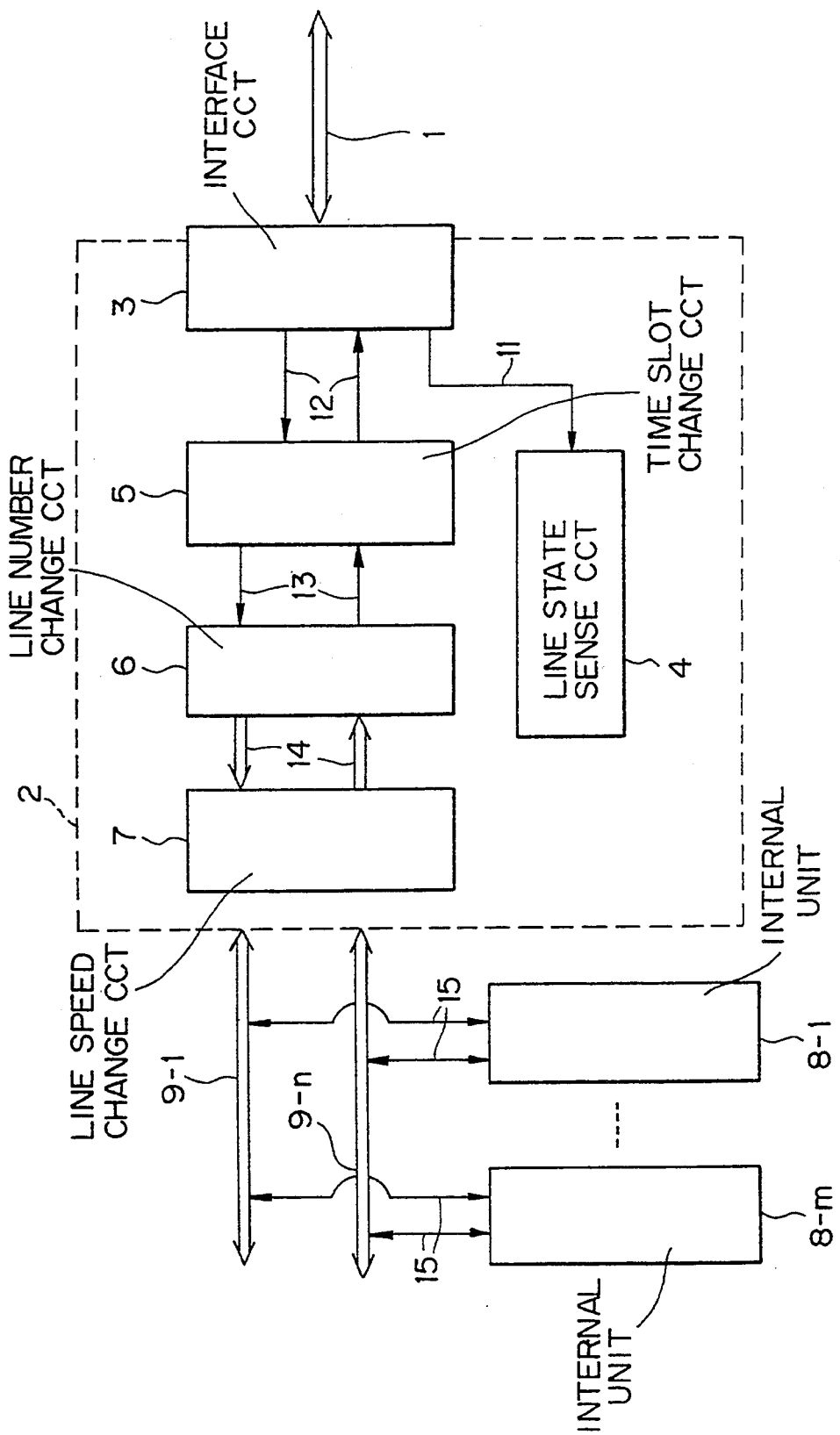
FIG. 4 is a block diagram schematically showing a high-speed transmission line system embodying the present invention.

Referring to FIG. 4, a high-speed transmission line system embodying the present invention is shown. The embodiment will be described with reference also be made to FIGS. 5 and 6. As shown in FIG. 4, the system embodying the present invention has a line interface 2 connected to a high-speed transmission line 1. The line interface 2 is made up of an interface circuit 3 for, for example, AMI/TTL conversion, a line state sensing circuit 4 connected to interface circuit 3 by line 11, a time slot changing circuit 5 connected to interface circuit 3 by lines 12, a line number changing circuit 6 6 connected to time slot change circuit 5 by lines 13, and a line speed changing circuit 7 connected to line number changing circuit 6 by lines 14. The line interface 2 is connected to internal units 8-1 to 8-m by internal lines 9-1 to 9-n and lines 15.

Figure 5:
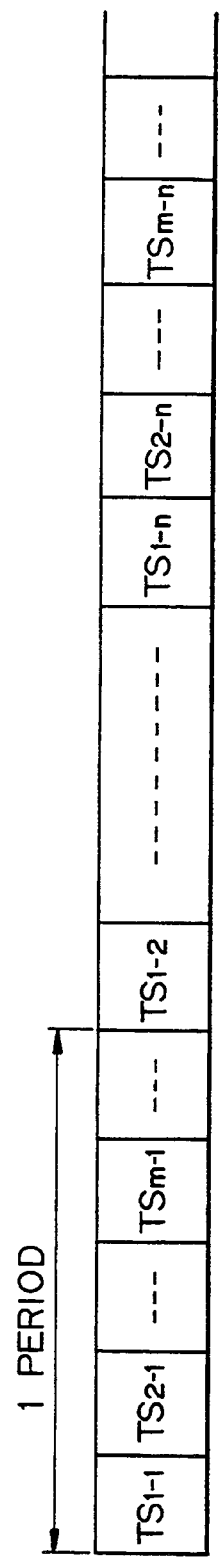
FIG. 5 shows a signal format available with the embodiment and in which time slots are changed.
Figure 6:
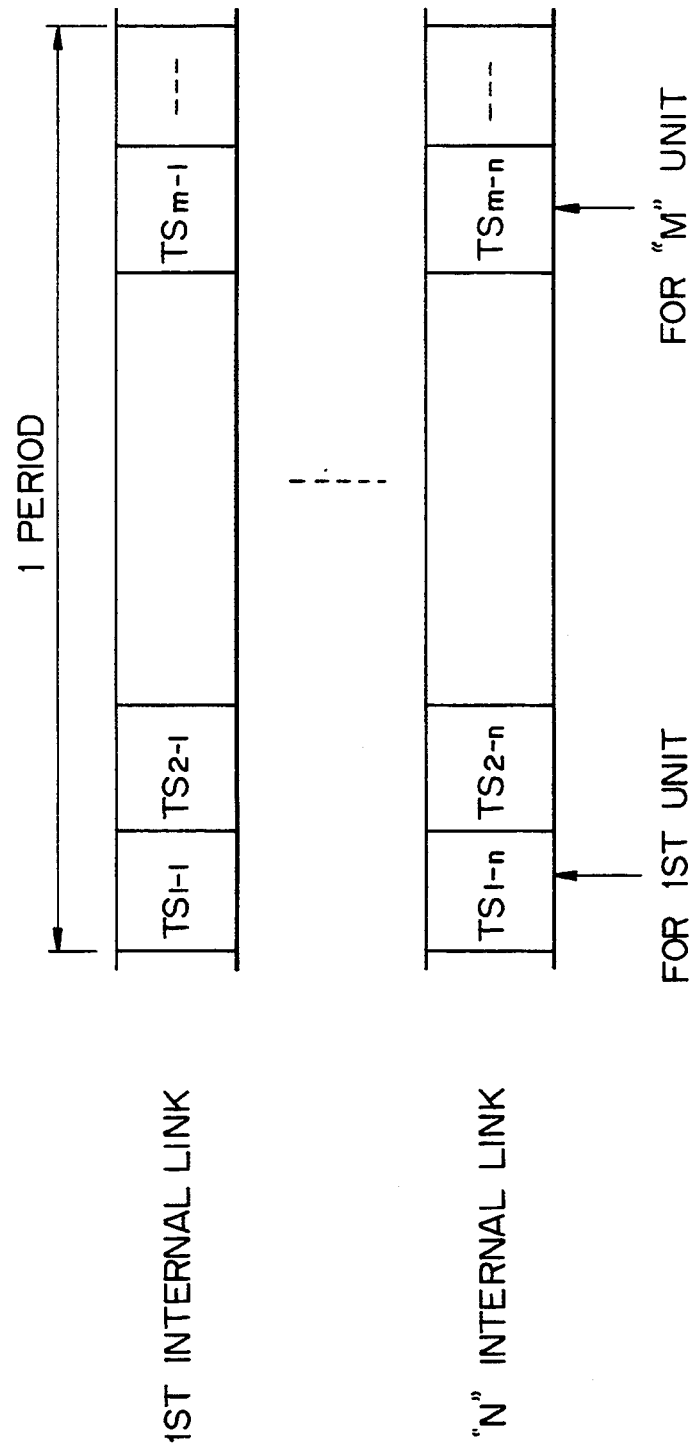
FIG. 6 shows a signal format in which line numbers are changed.

The high-speed transmission line 1 is converted to an internal level by the interface circuit 3 and then applied to the time slot changing circuit 5. In the embodiment, assume that the internal units 8-1 to 8-m each includes n blocks for transmitting and receiving n time slots, i.e., n data transmitting and receiving circuits. Therefore, at least n×m time slots exist on the transmission line 1. As shown in FIG. 5, the time slot changing circuit 5 changes (replaces) the order of time slots depending on which time slot on the transmission line 1 is occupied by which of the internal units 8-1 to 8-m. The time slot changing circuit 5 transfers the high-speed line whose time slots have been changed in matching relation to the units 8-1 to 8-m. As shown in FIG. 6, the line number changing circuit 6 changes the high-speed line to n lines on a period basis. Specifically, as shown in FIG. 5, the lines are changed such that the same time slots are assigned to each of n internal lines 9-1 to 9-n, e.g., time slots TS1-1 to TS1-n are assigned to the internal unit 8-1.

On receiving the n lines from the line number changing circuit 6, the line speed changing circuit 7 converts the high speed to a low speed and delivers it to the internal lines 9-1 to 9-n. Since the units 8-1 to 8-m are respectively connected to the internal lines 9-1 to 9-n, the time slots to be used by each of the units 8-1 to 8-m are the same on the internal lines. Therefore, it is not necessary to incorporate the same number of time slot selecting circuits as data transmitting and receiving circuits, i.e., a single time slot selecting circuit has only to be built in each of the units 8-1 to 8-m.

When data are sent from the units 8-1 to 8-m to the high-speed transmission line 1, the n internal lines 9-1 to 9-n are inputted to the line speed changing circuit 7 to have their speed changed to the high speed. The line number changing circuit 6 converges the lines 9-1 to 9-n to a single line. Subsequently, the time slot changing circuit 5 changes the time slots to ones matching the transmission line 1 and delivers the resulting time slots to the interface circuit 3. In response, the interface circuit 3 converts the level of the time slots and then feeds them out to the transmission line 1.

Figure 7:
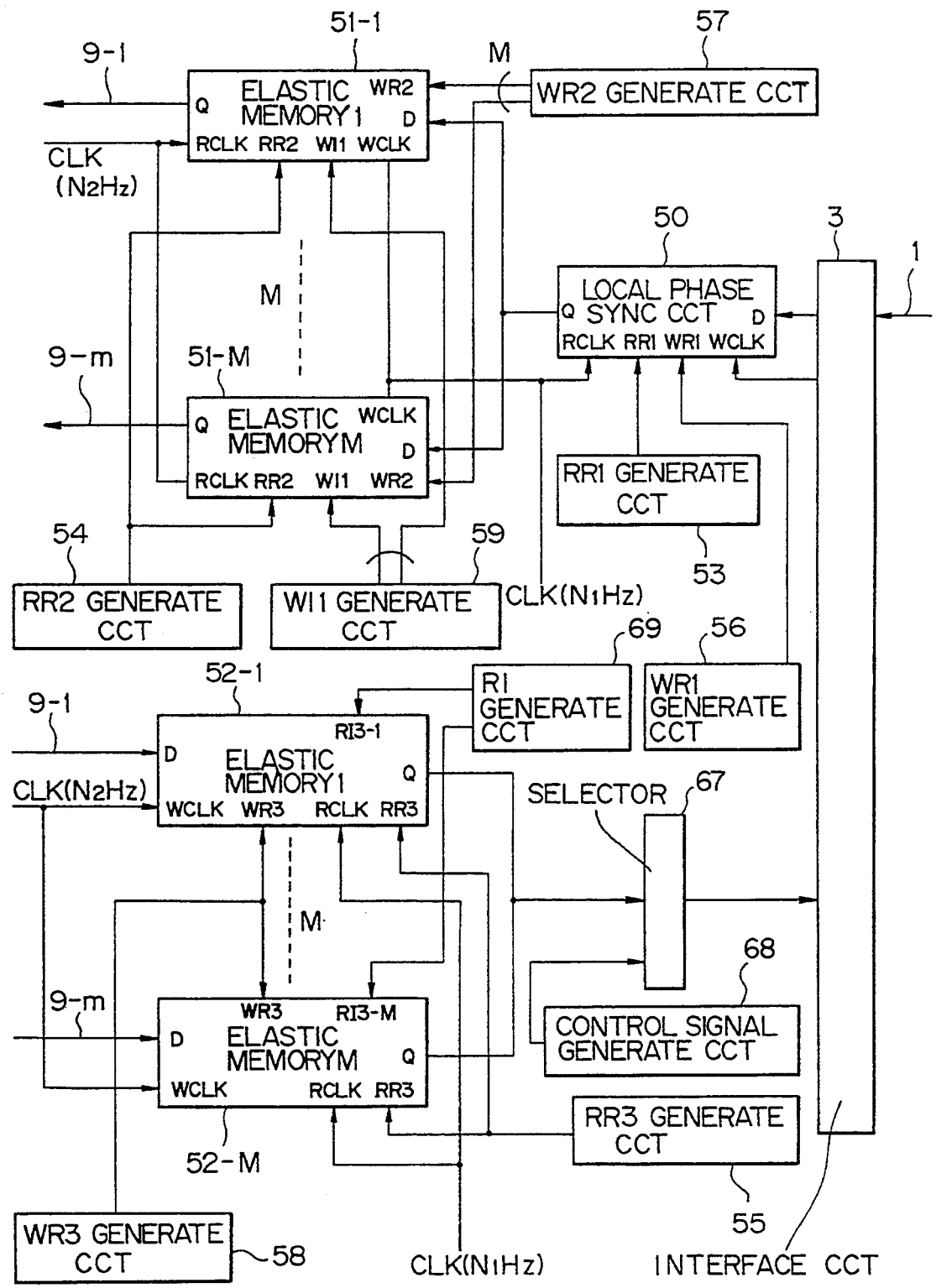
FIG. 7 shows a specific construction of a line interface included in the embodiment.
Figure 8:
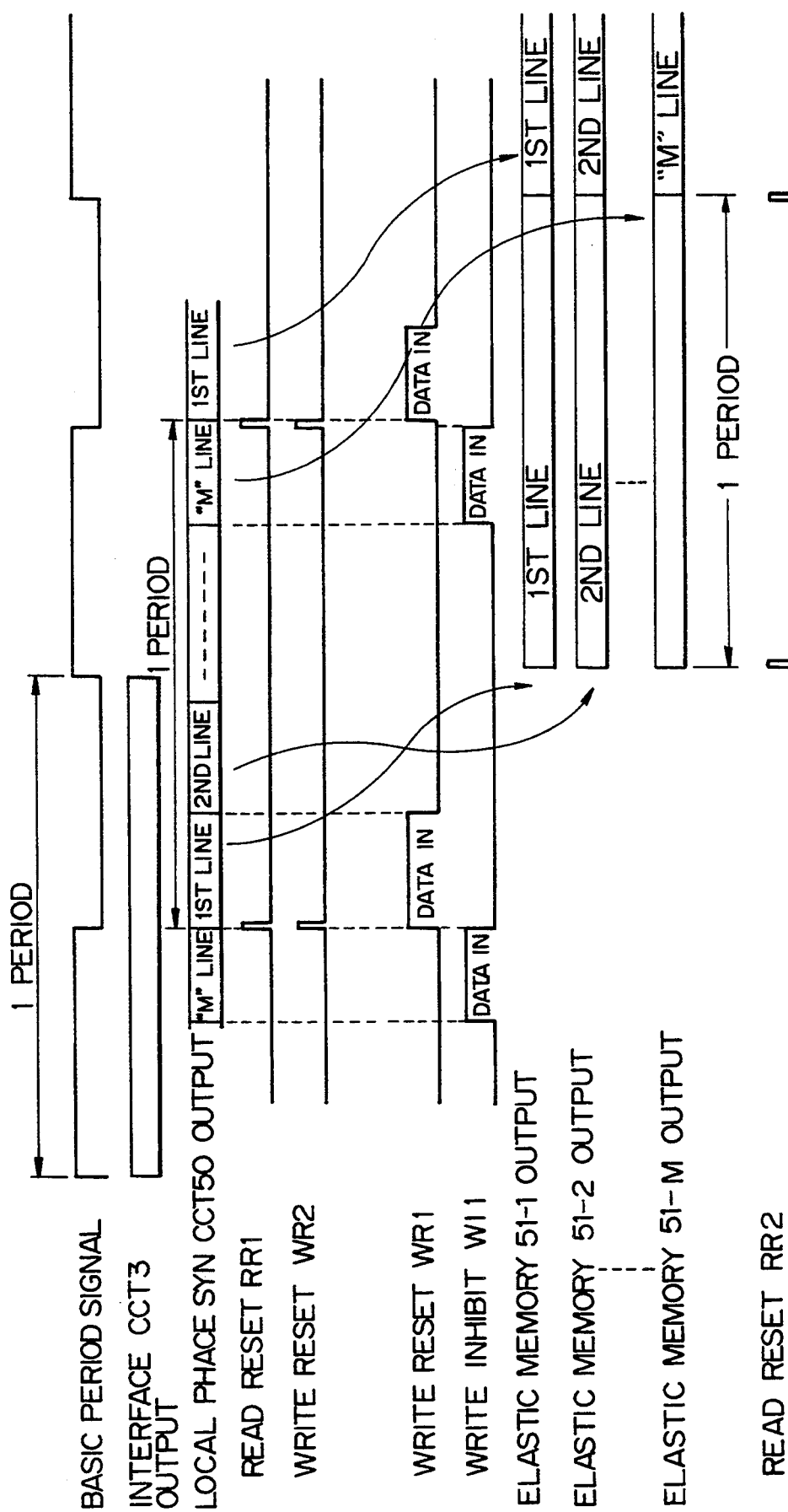
FIGS. 8 and 9 are timing charts demonstrating the operation of the embodiment.
Figure 9:
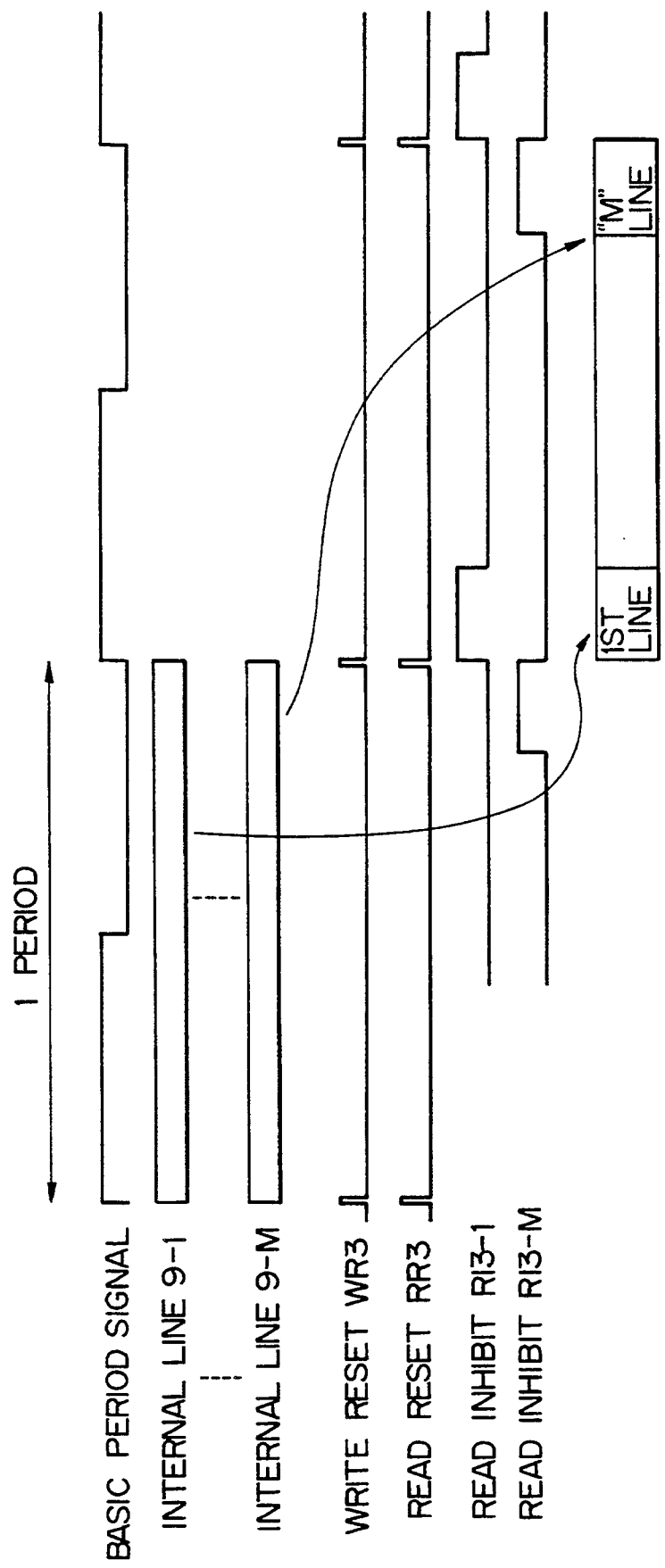

Referring to FIGS. 7, 8 and 9, a specific construction of the line interface 2, FIG. 4, will be described. As shown, the high-speed transmission line 1 and the low-speed internal lines 9 are assumed to have frequencies N1 and N2 (MHz), respectively. The line interface 2 accommodates m internal lines 9-1 to 9-m. There are shown in FIG. 7 a local phase synchronizing circuit 50, elastic memories 51-1 to 51-M and 52-1 to 52-M, an RR1 generating circuit 53 for generating a read reset signal R1, an RR2 generating circuit 54 for generating a read reset signal RR2, an RR3 generating circuit 55 for generating a read reset signal RR3, a WR1 generating circuit 56 for generating a write reset signal WR1, a WR2 generating circuit 57 for generating a write reset signal WR2, a WR3 generating circuit 58 for generating a write reset signal WR3, a WI1 generating circuit 59 for generating a write inhibit signal WR1, an RI generating circuit 69 for generating signals RI3-1 to RI3-M, a selector 67, and a control signal generating circuit 68.

In operation, in the event of reception, a signal from the high-speed transmission line 1 is applied to the local phase synchronizing circuit 50 as data having the frequency N1. The local phase synchronization is customary with an ordinary transmission line interface and implemented with a local clock in place of a remote clock which suffers from, for example, jitter. As shown in FIG. 8, the data resulting from the local is stable at the negative-going edges of a basic period signal. The beginning of the data output is indicated by the read reset signal RR1. The elastic memories 51-1 to 51-M change the time slots, line number, and speed. Specifically, the write reset signals WR initialize the input addresses to the elastic memories 51-1 to 51-M while the write inhibit signal WI generates an input permission timing. The output timing is indicated by the read reset signal RR2 and is synchronous with a low-speed line clock CLK (N2 MHz).

At the time of transmission, the low-speed internal lines 9-1 to 9-m are synchronous with the basic synchronizing signal, as shown in FIG. 9. The write reset signal WR3 initializes the write addresses of the elastic memories 52-1 to 52-M to thereby write one period of data. The data are read out of the elastic memories 52-1 to 52-M in synchronism with the clock (N1) of the high-speed line 1 in response to the read timing generated by the RI generating circuit 60 and meant for each memory. As shown in FIG. 9, this timing differs frown one memory to another. As a result, speed and line number are changed. After the low speed to high speed conversion, a control signal meant for the high-speed line 1 (e.g. framing signal) is inserted in the data and then sent out to the line 1 via the interface circuit 3.

Figure 10:
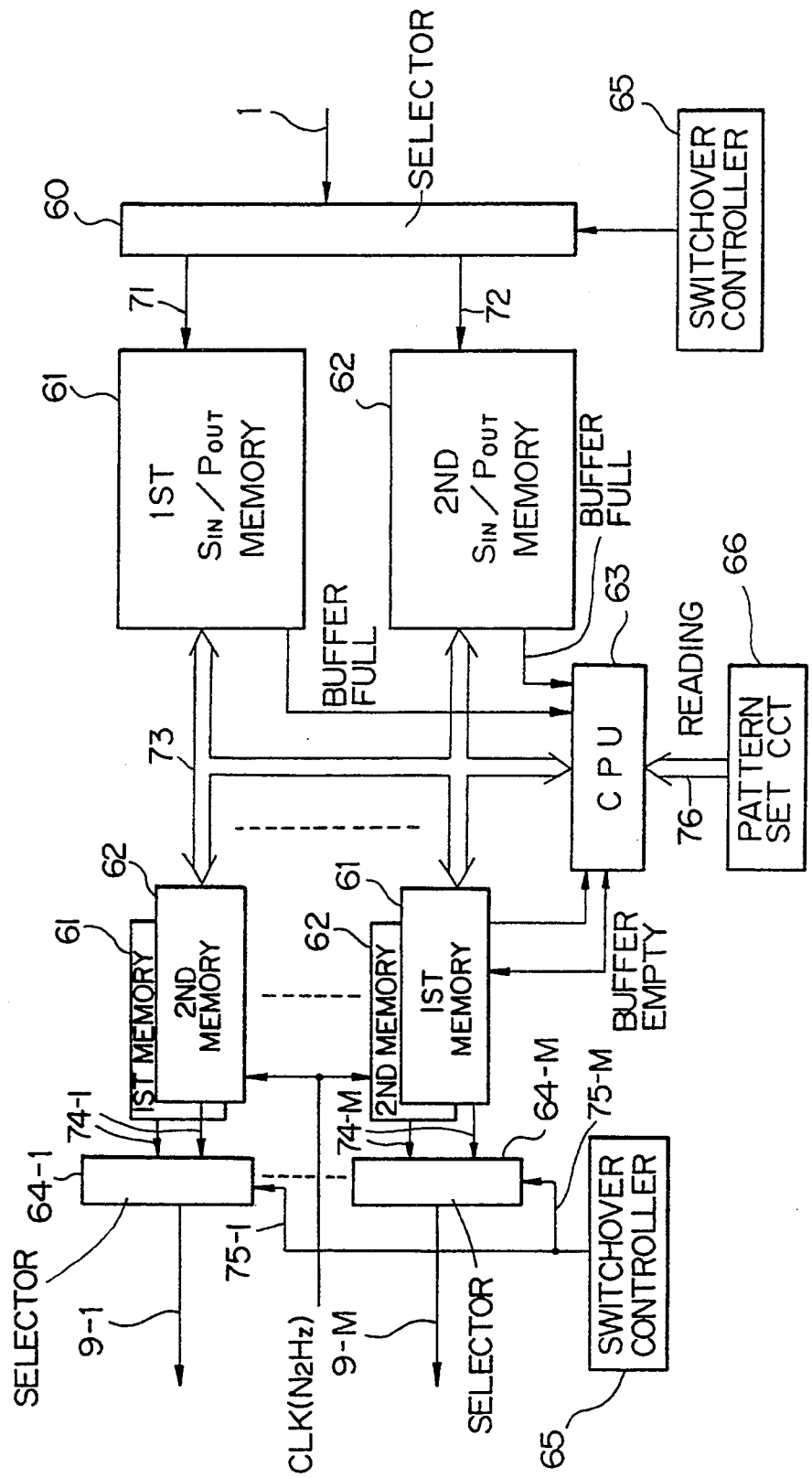
FIG. 10 shows another specific construction of the line interface of the embodiment.

FIG. 10 shows another specific construction of the interface 2 while FIG. 11 demonstrates a specific operation thereof. The construction of FIG. 10 differs from that of FIG. 7 in that it implements the conversion of the time slots with software. There are shown in FIG. 10 a selector 60 connected to high speed transmission line 1, a first serial IN/parallel OUT memory 61 and a second serial IN/parallel OUT memory 62 respectively connected to selector 60 by lines 71 and 72, a CPU (Central Processing Unit) 63 connected to the memories by bus 73, selectors 64-1 to 64-M connected to the memories by lines 74-1 to 74-m, a switchover controller 65, and a pattern setting circuit 66 connected to the CPU by bus 76. In operation, data on the high-speed transmission line 1 are serially and alternately applied to the first and second serial IN/parallel OUT memories 61 and 62 every basic period (one frame). When one frame of data is accumulated, a signal BUFFER FULL is outputted from the memory 61 or 62 of interest. The CPU 63 reads the data out of the full serial IN/parallel OUT memory 61 or 62 one byte at a time and writes them to an output portion of one of the two memories 61 and 62 at a predetermined address (time slot, phase, etc.) designated for one of the lines 9-1 to 9-M set by the pattern setting circuit 66 and indicating "buffer empty". After data have been written in all the addresses (time slots), the CPU 63 permits transmission and sends the data in synchronism with the low-speed line clock CLK (N2) and at the timing for switching over the selectors 64-1 to 64-M. In the next period, data having been written in the opposite system are sent. At this instant, the low speed to high speed conversion is also effected in the opposite sequence. The flow of this process is described in FIG. 11. Decision block 101 determines which buffer (61 — the first buffer, or 62 — the second buffer) has a full input section. Next, at decision block 102 or 103 (depending on which buffer was full at block 101), a determination is made as to which of the two buffers has an empty output portion. Data transmission then proceeds as described above with respect to FIG. 10.

In summary, it will be seen that the present invention provides a line interface having a speed changing circuit which replaces a high-speed transmission line with n low speed internal lines. Hence, data transmitting and receiving circuits in each internal unit operate at low speed, saving power to be consumed by the internal unit. Moreover, since the time slots which each internal unit uses are the same on all of the internal lines, a single time slot selecting circuit suffices for each internal unit, promoting efficient circuit configuration.

Various modifications will become possible for those skilled in the art after receiving the teachings of the present disclosure without departing from the scope thereof.

What is claimed is:

1. A high-speed transmission line system connected to a high-speed transmission line for transmitting and receiving one time slot of said high-speed transmission line, said system comprising:
    m internal units each being made up of n data transmitting and receiving blocks, where m and n are integers;
    n low-speed internal lines, each of said low-speed internal lines being connected to each of said m internal units; and
    line interface means for converting time slots of a signal received over said high-speed transmission line to said n low-speed internal lines, said line interface means further reconstructing said n low-speed internal lines into a single high-speed line and connecting said single high-speed line to said high-speed transmission line;
    wherein each of said n blocks of each of said m internal units selects the same time slot from each of said n low-speed internal lines.

2. A system as claimed in claim 1, wherein said line interface means comprises:
    a time slot changing means for changing time slots from said high-speed transmission line to a predetermined order matching said internal units, and rearranging time slots changed in a predetermined order to recover time slots for said high-speed transmission line;
    line number changing means connected to said time slot changing means for dividing the changed time slots into n high-speed lines in matching relation to said low-speed internal lines, and combining said n high-speed lines to recover the time slots changed to said predetermined order; and
    line speed changing means connected to said line number changing means for changing the n high-speed lines to the n internal low-speed lines, and combining the n internal low-speed lines to recover the n high-speed lines.

3. A data interface between a high-speed transmission line and a plurality of internal units, said data interface comprising:
    an interface circuit, said interface circuit being connected to said high-speed transmission line, said interface circuit converting data from said high-speed transmission line to internal level data,
    a time slot change circuit, connected to said interface circuit, said time slot change circuit rearranging said internal level data into ordered data, said ordered data being in an order corresponding to said internal units,
    a line number change circuit, connected to said time slot change circuit, said line number change circuit dividing said ordered data into a plurality of lines of data, and
    a line speed change circuit, connected to said line number change circuit, said line speed change circuit converting said plurality of lines of data into reduced speed data by reducing the speed of said plurality of lines of data, and supplying said reduced speed data to said internal units on a plurality of internal lines.

4. The data interface recited in claim 3, wherein said reduced speed data is arranged in periods of data, each period of data comprising a plurality of time slots, such that each of said internal units can retrieve its data by retrieving data contained in a predetermined one of said time slots from each of said periods of data.

5. The data interface recited in claim 3, wherein:
    said line speed change circuit receives said reduced speed data from said internal units on said internal lines, and increases the speed of said reduced speed data to that of said plurality of lines of data,
    said line number change circuit combines said plurality of lines of data into said ordered data,
    said time slot change circuit rearranges said ordered data into said internal level data, and
    said interface circuit converts said internal level data into a form suitable for transmission on said high-speed transmission line.

6. The data interface recited in claim 4, wherein each period of data is assigned to an internal line.

* * * * *